(12) United States Patent  
De Bruyker et al.

(10) Patent No.: US 8,130,072 B2  
(45) Date of Patent: Mar. 6, 2012

(54) VANADIUM OXIDE THERMAL MICROPROBES

(75) Inventors: Dirk De Bruyker, San Jose, CA (US); Michal V. Wolkin, Los Altos Hills, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 267 days.

(21) Appl. No.: 12/467,089

(22) Filed: May 15, 2009

(65) Prior Publication Data

US 2010/0289613 A1    Nov. 18, 2010

Related U.S. Application Data

(60) Provisional application No. 61/178,337, filed on May 14, 2009.

(51) Int. Cl.  
*H01C 7/00* (2006.01)

(52) U.S. Cl. .......................................... 338/22 R; 338/28

(58) Field of Classification Search .................... 338/28, 338/22 R  
See application file for complete search history.

(56) References Cited

U.S. PATENT DOCUMENTS 3,717,798 A * 2/1973 Kahn ............................ 257/769

(Continued)

OTHER PUBLICATIONS

Recht et al., "Enthalpy Array Analysis of Enzymatic and Binding Reactions", Analytical Biochemistry, 377(1), Jun. 1, 2008, pp. 33-39.

(Continued)

*Primary Examiner* — James Harvey  
(74) *Attorney, Agent, or Firm* — Fay Sharpe LLP

(57) ABSTRACT

A temperature probe includes a substrate, a cantilever body portion formed on the substrate, having an anchor portion held in contact to the substrate and a free end portion extending out of the surface of the substrate, and a sputter-deposited thermistor sensor portion located at the free end portion of the cantilever body portion.

19 Claims, 9 Drawing Sheets

U.S. PATENT DOCUMENTS

| | | | |
|---|---|---|---|
| 4,928,513 A * | 5/1990 | Sugihara et al. | 73/25.03 |
| 5,048,336 A * | 9/1991 | Sugihara et al. | 73/29.01 |
| 6,096,559 A | 8/2000 | Thundat et al. | |
| 6,734,425 B2 | 5/2004 | Hantschel | |
| 6,895,645 B2 | 5/2005 | Xu et al. | |
| 6,973,722 B2 | 12/2005 | Hantschel et al. | |
| 7,082,684 B2 * | 8/2006 | Hantschel et al. | 29/874 |
| 7,141,210 B2 | 11/2006 | Bell et al. | |
| 7,147,763 B2 | 12/2006 | Elrod et al. | |
| 7,230,440 B2 | 6/2007 | Hantschel et al. | |
| 7,241,420 B2 * | 7/2007 | Hantschel et al. | 422/502 |
| 7,344,906 B2 | 3/2008 | Chua et al. | |
| 7,356,920 B2 | 4/2008 | Hantschel et al. | |
| 7,413,706 B2 | 8/2008 | Peeters | |
| 7,416,897 B2 | 8/2008 | Bruce | |
| 7,419,835 B2 | 9/2008 | Torres | |
| 7,473,030 B2 | 1/2009 | Bruce et al. | |
| 7,473,031 B2 | 1/2009 | Wolkin et al. | |
| 7,497,613 B2 * | 3/2009 | King et al. | 374/141 |
| 7,521,253 B2 | 4/2009 | Bruce | |
| 7,754,492 B2 | 7/2010 | Bell | |
| 7,833,800 B2 | 11/2010 | De Bruyker et al. | |
| 2003/0183761 A1 * | 10/2003 | Hantschel et al. | 250/306 |
| 2005/0102833 A1 * | 5/2005 | Hantschel et al. | 29/874 |
| 2006/0132542 A1 | 6/2006 | De Bruyker | |
| 2006/0254345 A1 * | 11/2006 | King et al. | 73/105 |
| 2009/0249521 A1 * | 10/2009 | Dazzi et al. | 850/33 |
| 2010/0216669 A1 * | 8/2010 | Hantschel et al. | 506/40 |
| 2010/0289613 A1 * | 11/2010 | De Bruyker et al. | 338/22 R |
| 2010/0290501 A1 * | 11/2010 | De Bruyker et al. | 374/31 |

OTHER PUBLICATIONS

Recht et al., "Measurement of Enzyme Kinectics and Inhibitor Constants Using Enthalpy Arrays", Analytical Biochemistry, 388(2), May 15, 2009, pp. 204-212.

Recht et al., "Application of Enthalpy Arrays to Fragment-based Screening", Fragment-Based Lead Discovery Conference, 2008, San Diego, CA.

Recht et al., "Enzymatic Assays for Fragment-Based Screening Using Enthalpy Arrays", Drug Discovery Conference: Fragment-Based Techniques Conference, 2009, San Diego, CA.

Vettiger, et al., Ultrahigh Density, High-Data-Rate NEMS-Based AFM Storage System, Microelectronic Engineering, vol. 46, No. 1-4, pp. 101-104, 1999.

Chua et al., "Out-of Plane High-Q Inductors on Low Resistance Silicon" IEEE/ASME Journal of Microelectromechanical Systems, 12, 2003, pp. 989-995.

Hantschel et al., "Fabrication of Highly Conductive Stressed-Metal Springs and their Use as Sliding Contact Interconnects", Microelectronic Engineering, 67-69 (2003), pp. 690-695.

Rosa et al., A Novel External Electrode Configuration for the Electrostatic Actuation of MEMS Based Devices, IOP Journal of Micromechanics and Miroengineering, 14 (2004), pp. 446-451.

Dau et al., A dual axis gas gyroscope utilizing low-doped silicon thermistor, Proc. IEEE MEMS, 2005, Miami, p. 626.

Kuznetsov et al., "High Temperature Coefficient of Resistance in Vanadium Oxide Diodes", Review of Scientific Instruments, 68, 1997, pp. 1518.

StressEdMetal MEMS Solutions, Palo Alto Research Center, 2002, 1 pg., http://www.parc.com/research/projects/stressedmetal/.

COMSOL Multiphysics, http://en.wikipedia.org/wiki/COMSOL_Multiphysics, downloaded from the Internet May 2, 2009, pp. 1-2.

De Bree et al., The Microflown: a novel device measuring acoustical flows, Sensors and Actuators: A Physical, vol. SNA054/1-3, pp. 552-557, 1996.

Price et al., Micro-Thermal Analysis: Scanning Thermal Microscopy and Localised Thermal Analysis, Int. J. Pharm., 192, pp. 85-96, 1999.

Fiege et al., Thermal characterization of power devices by scanning thermal microscopy techniques, Microelectronics Reliability, vol. 39, p. 1149, 1999.

Sanders et al., Discrimination of Polymorphic Forms of a Drug Product by Localized Thermal Analysis, Journal of Microscopy, vol. 198, Pt. 2, May 2000, pp. 77-81.

Marini et al., Physico-Chemical Characterization of Drugs and Drug Forms in the Solid State, Current Medicinal Chemistry—Anti-Infective Agents, Dec. 2003, vol. 2, No. 4, pp. 303-321.

Recht et al., "Enthalpy Arrays for Enzymatic Assays in Fragment-Based Screening", to be presented at Assay Development & Screening Technologies Conference, San Francisco, CA, 2009.

Linder et al., "Stressed Metal Nanosprings", PennWell Corp., Advanced Packaging, vol. 11, Issue 11, 2002.

Website: www.microflown.com, Aug. 22, 2011, 12 pgs.

* cited by examiner

VANADIUM OXIDE THERMAL MICROPROBES

This application claims the benefit of priority to U.S. Provisional Patent Application No. 61/178,337, filed May 14, 2009, entitled "Vanadium Oxide Thermal Microprobes", by Dirk De Bruyker et al., the disclosure of which is hereby incorporated by reference in its entirety.

STATEMENT REGARDING FEDERALLY SPONSORED RESEARCH OR DEVELOPMENT

This invention was made with the United States Government support under Cooperative Agreement No. R01GM077435 awarded by the National Institute of Health (NIH). The United States Government has certain rights in the invention.

INCORPORATION BY REFERENCE

U.S. Pat. No. 7,473,031, titled, Resistive Thermal Sensing; U.S. Pat. No. 7,230,440, titled, Curved Spring Structure With Elongated Section Located Under Cantilevered Section; U.S. Pat. No. 7,082,684, titled, Intermetallic Spring Structure; U.S. Pat. No. 6,973,722, titled, Release Height Adjustment Of Stressy Metal Devices By Annealing Before And After Release; and U.S. Pat. No. 6,895,645, titled, Methods To Make Bimorph MEMS Devices; U.S. Pat. No. 7,344,906, titled Structure And Method For Releasing Stressy Metal Films; U.S. Pat. No. 7,356,920, titled Micro-Machined Structure Production Using Encapsulation; and U.S. patent application Ser. No. 12/467,072, Nanocalorimeter Based On Thermal Probes, by De Bruyker, et al., filed May 15, 2009, are each hereby incorporated herein by reference in their entireties.

BACKGROUND

This application relates generally to a device and method for making the device for improved temperature sensing and more specifically to improved high-sensitivity thermal sensing on the micro-scale and nano-scale by improved temperature sensors.

Photo-lithographically patterned spring structures (sometimes referred to as "micro-springs") represent one type of micro-machined structure that has been developed, for example, to produce low cost temperature probes. Such structures have also been used as probe cards, and to provide electrical connections between integrated circuits, circuit boards, and electrode arrays, and for producing other devices such as inductors, variable capacitors, and actuated mirrors, among other uses. Conventional spring structures include a spring metal finger (beam) having a flat anchor portion secured to a substrate, and a curved free cantilever portion extending from the anchor portion and bending away or coming out from the substrate (i.e., such that an air-gap is defined between the tip of the spring metal finger and the substrate to which the anchor portion is attached).

The spring metal finger is formed from a stress-engineered metal film (i.e., a metal film fabricated such that its lower portions have a different internal stress than its upper portions) that is at least partially formed on a release material layer. The free cantilever portion of the spring metal finger bends away from the substrate when the release material located under the spring finger is etched away. The internal stress gradient is produced in the spring metal by layering different metals having the desired stress characteristics, or using a single metal by altering the fabrication parameters. The stress-engineered metal films used to form spring structures are processed by sputtering deposition methods, and/or plating deposition methods It is considered that additional advances to the spring structures previously disclosed, when used in connection with temperature probes would be useful in a number of environments. The following therefore discloses advances to temperature probes employing processing methods used in making spring structures.

BRIEF DESCRIPTION

A temperature probe includes a substrate, a cantilever body portion formed on the substrate, having an anchor portion held in contact to the substrate and a free end portion extending out of the surface of the substrate, and a sputter-deposited thermistor sensor portion located at the free end portion of the cantilever body portion.

DETAILED DESCRIPTION

Figure 1A:
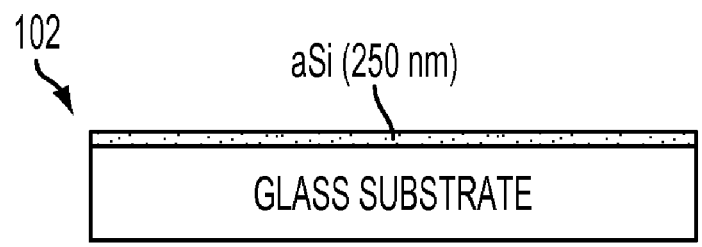
FIGS. 1A-1E depict a process flow for manufacturing a monolithic cantilever temperature probe.
Figure 1B:
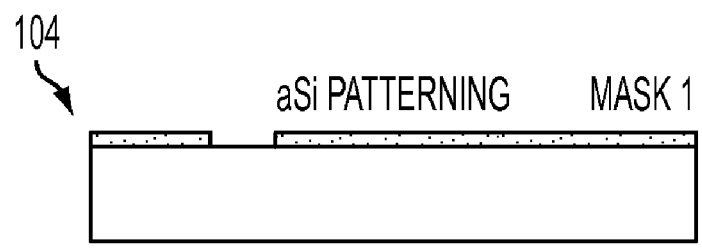
Figure 1C:
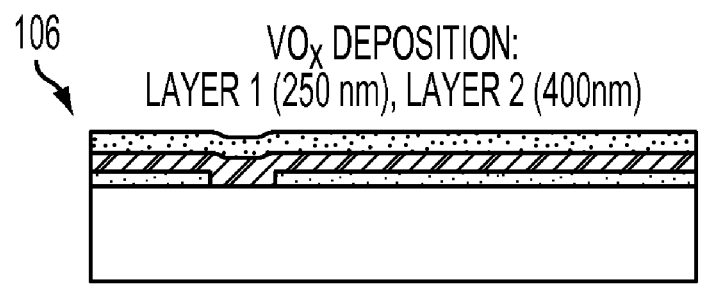
Figure 1D:
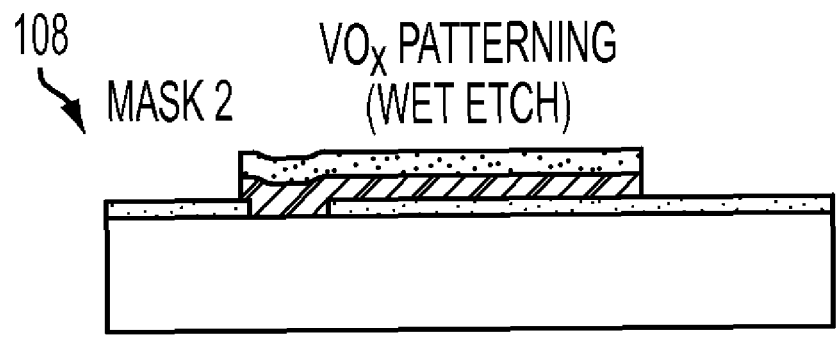
Figure 1E:
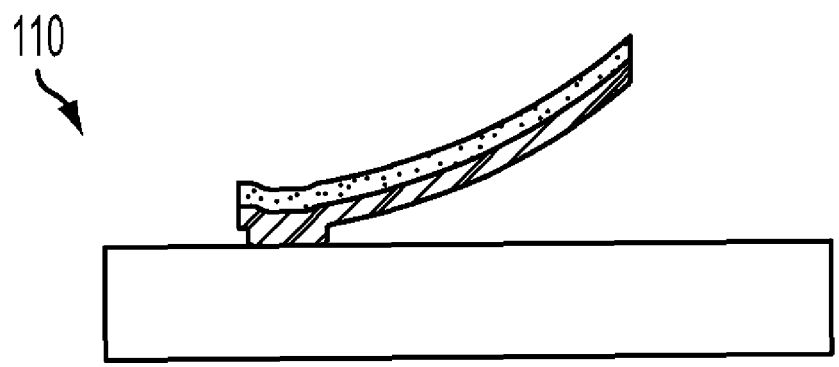
Figure 2:
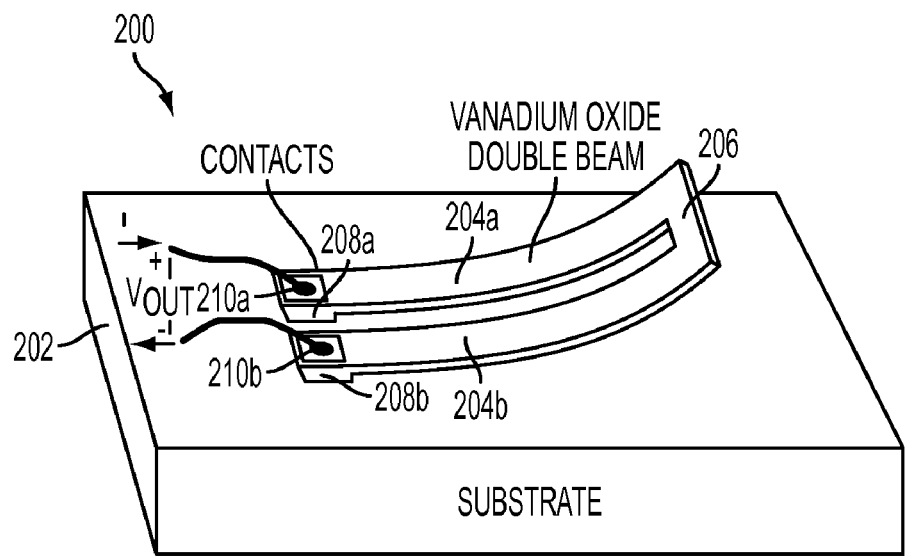
FIG. 2 illustrates a monolithic cantilever temperature probe, manufactured according to FIGS. 1A-1E.
Figure 3A:
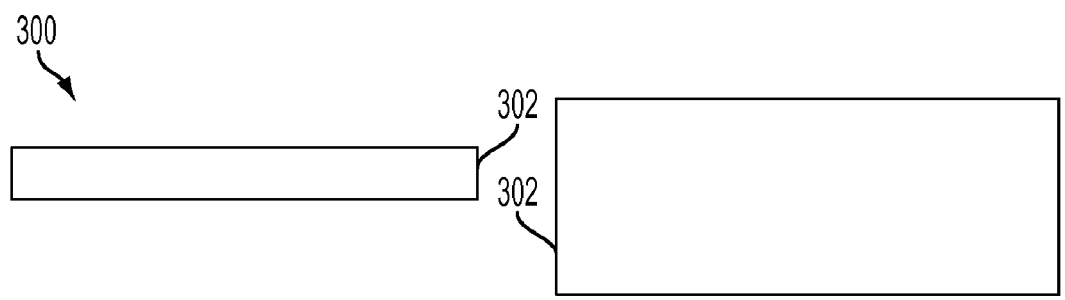
FIGS. 3A-3J depict a process flow for manufacturing a hybrid cantilever temperature probe.
Figure 3B:
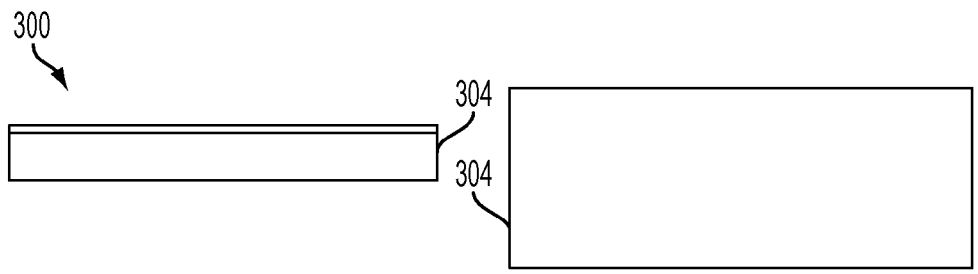
Figure 3C:
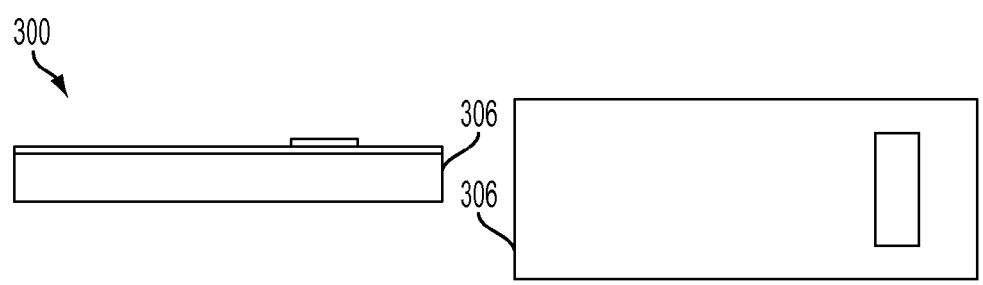
Figure 3D:
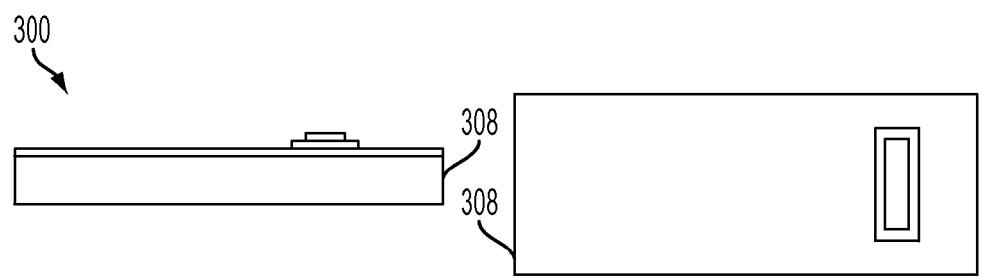
Figure 3E:
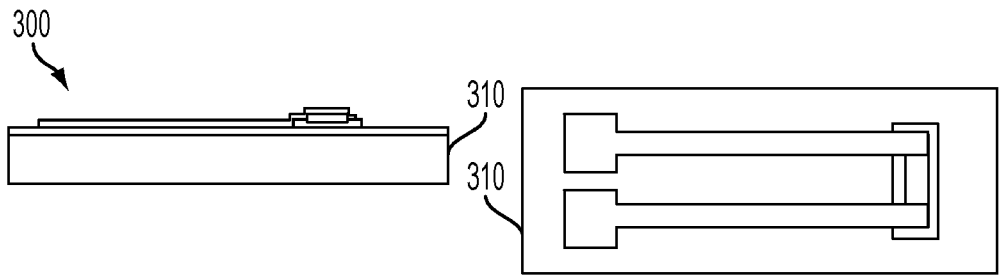
Figure 3F:
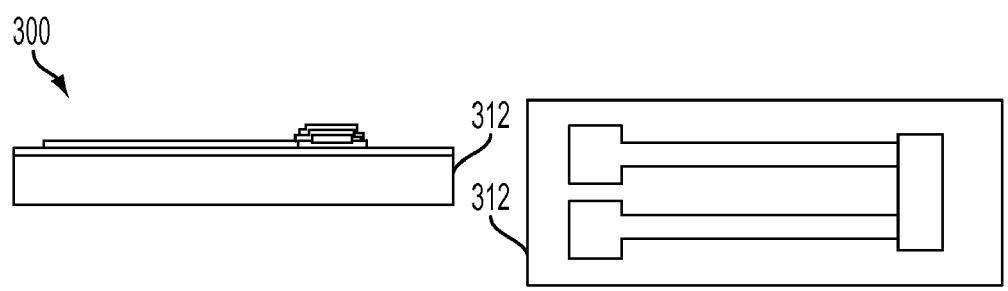
Figure 3G:
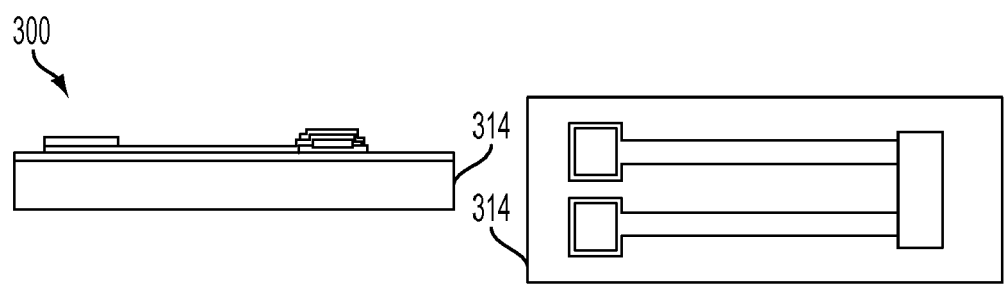
Figure 3H:
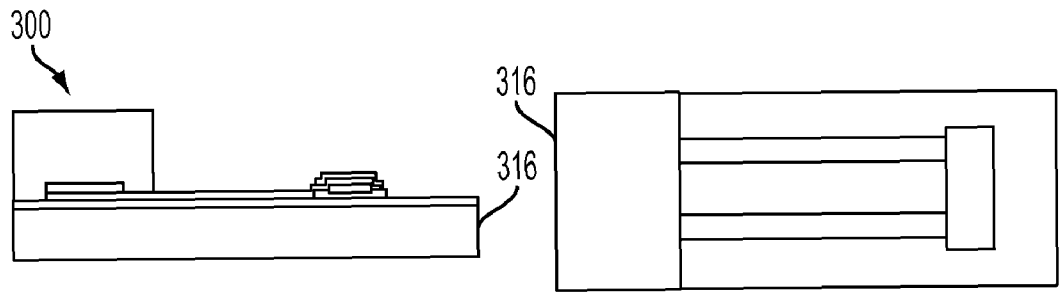
Figure 3I:
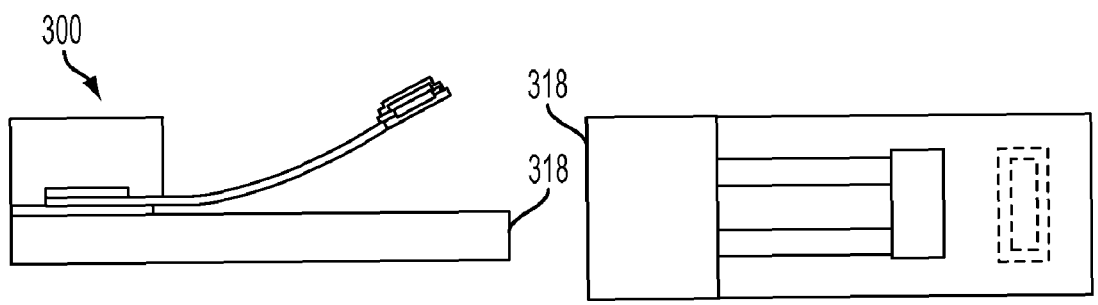
Figure 3J:
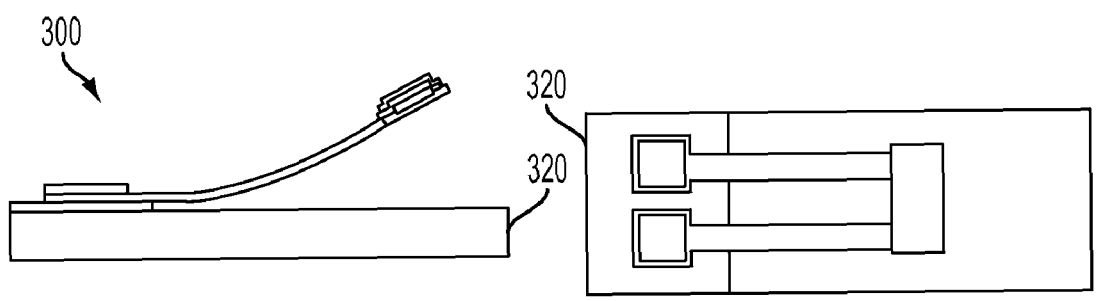

Turning now to FIGS. 1A-1E, depicted is a process 100 to form a monolithic cantilever structure. In this embodiment stress-engineered sputter-deposited vanadium oxide ($VO_x$) cantilever probes are formed, which can be used as temperature sensing components. As depicted in FIG. 2 a cantilever temperature probe 200 formed by this process is in one embodiment formed on a substrate 202, with two connected legs 204a, 204b, connected by a tip portion 206. Also included are two anchor points 208a, 208b. The probe is a monolithic probe as it consists entirely of a sputter-deposited semiconductor material, such as sputtered vanadium oxide, and which at the same time forms the curved cantilever structure defined by legs 204a, 204b, anchor points 208a, 208b and tip portion 206. As also illustrated in FIG. 2, on top of anchor points 208a and 208b are electric contact pads 210a, 210b, which provide input for electrical power to probe 200. By this design probe 200 defines an electrical resistor used as temperature sensor (thermistor). In operation, a sensing current is sent through the two legs of the cantilever portion and the tip portion, and an output voltage is proportional to the electrical resistance of the structure, which is a function of the temperature along the beams (i.e., legs).

The combination of the high temperature coefficient of resistance and low 1/f noise of vanadium oxide results in superior thermal sensing specifications. In this embodiment the shorter width of tip portion 206 compared to legs 204a,

204b act to increase the resistance in the tip portion. Alternative embodiments include designing the tip portion to have a point or other configuration to increase the resistance at the tip portion.

With continuing attention to FIGS. 1A-1E, in a step 102 a thin sacrificial film layer, such as amorphous silicon, titanium or other appropriate material, is deposited on an appropriate substrate, such as silicon. In step 104 the sacrificial layer is patterned, and then in step 106 a first layer of vanadium oxide and a second layer of vanadium oxide are, in one embodiment, sputter-deposited in a low temperature DC-sputtering process. After the deposition of the vanadium oxide layers, the layers are patterned, in one embodiment by a wet etching process, in step 108. Thereafter, the sacrificial layer is etched in step 110 to release the cantilever structure consisting of two layers of stressed vanadium oxide. In one embodiment a gaseous xenon difluoride release etch process is used to release the components. The released structure is a monolithic temperature probe, which is at one end anchored to the substrate while a free end extends out of the substrate.

In process 100, two lithography steps are performed in the patterning operation in steps 104 and 108 to form the cantilever shape. While the cantilever shape is shown as a two-legged configuration, by altering the patterning operation other configurations are obtained, such as a single leg structure, or structures having multiple (more than two legs). Also, the tip portion can also be patterned into alternative designs, including a pointed structure, among others. In addition, alternative embodiments including evaporation or chemical vapor deposition are used in place of the sputtering processes. The following sputtering conditions are employed in at least one embodiment:

For the first $VO_x$ layer: 600 W DC power, 10:1 $Ar:O_2$ ratio, 1.6 mTorr total pressure, 250 nm thickness (±25 min); and For the second $VO_x$ layer: 600 W DC power, 10:1 $Ar:O_2$ ratio, 7.6 mTorr total pressure, 400 nm thickness (±40 min)

It is noted the target material is 99.9% pure (metallic) vanadium.

These conditions result in cantilever lift heights of about 70 um for single cantilevers 300 um long and 30 um wide. Measured stress values were 245 MPa compressive stress in the first layer and 48 MPa tensile stress in the second layer. Of course it is to be appreciated the above operational conditions, values and measured results are one set of parameters using certain sizes and amounts of materials. It is to be appreciated these parameters, sizes and amounts can be adjusted depending on the probes being designed, resulting in differing results and parameters. For example, While the above description notes the Argon (Ar) to Oxygen ($O_2$) ratio is 10 to 1, in other embodiments the amount of Argon may be in a range of 20:1 ($Ar:O_2$) to 5:1 ($Ar:O_2$) times more prevalent than the Oxygen. It is also noted the other above recited conditions will also operate in ranges other than the specific numbers which have been recited, such as the 600 W DC power, may range from 100 W to 800 W DC for particular operations, and the pressure applied during the depositing may range between 1 mTorr to 10 mTorr.

Sputtered vanadium oxide films show a behavior similar to the 'traditional' stressed metal materials such as molybdenum and chromium alloy (MoCr) or Nickel and Zirconium alloy (NiZr), where lower sputtering pressures result in denser layers with compressive stress, and higher sputtering pressure values lead to tensile stress in the film. A particular point of difference between process 100 (and of the to be described process 300) of the present application and existing stress generating processes, is that in the case of the sputtered vanadium, the vanadium is being oxidized in situ, due to the presence of oxygen in the chamber.

Vanadium oxide has properties that make it an excellent candidate material for thermistors, these include a combination of relatively high temperature coefficient of resistance (TCR) and low resistivity, as well as low electrical 1/f noise.

The thermistor material (e.g., vanadium oxide) is also employed here as a structural material. It's unique compared to other micromachined materials as its TCR is higher, for resistivities that are comparable or even much higher: lowly p-doped single crystalline silicon for instance has a TCR of up to 0.48%/K, versus about 3% for vanadium oxide. At the same time, the 1/f noise of vanadium oxide is very low, e.g., within a factor of three of the Johnson noise over a typical measurement bandwidth for a nanocalorimeter. Johnson noise is the random variation of voltage due to thermal agitation of charge carriers in an electrical conductor (e.g., a resistor).

Dual beam structures such as formed by processes 100 and the to be described process 300 of FIG. 3A-3J (as well as variants on these processes) will be highly sensitive to the temperature measured along the beams (legs). Also, due to the fact the beams are lifted out of the plane of the substrate and they are very thin, necessary thermal insulation from the substrate is provided.

If it is assumed heat conduction through the solid legs (beams) is dominant, the thermal RC time constant can be estimated as follows: assuming values for $VO_x$ heat conductivity, heat capacity and density of 0.75 W/m·K, 487 J/kg·K and 5800 kg/m$^3$ respectively, the heat resistance of one leg of length 800 um, width 10 um and thickness 1 um is 1.1E8 K/W; the heat resistance between the tip and the substrate is then 1.1E8/2; the heat capacitance of the dual beam structure is about 2.8E-8 J/K and the thermal time constant hence about 1.5 seconds.

This thermal time constant determines the lower limit of the bandwidth of the sensor (slowest changes that can still be detected). The time constant increases linearly with the length of the beams.

Prototypes of the monolithic vanadium oxide beams formed by process 100 and measurements of the temperature coefficient of resistance (TCR) and the Noise Equivalent Temperature Difference (NETD) have been performed and are similar to the values measured on an integrated nanocalorimeter vanadium oxide ($VO_x$) devices (such as described in U.S. Pat. No. 7,473,031, the TCR is about 3%, and the NETD is about 10 to 30 uK (Kelvin).

Figure 4:
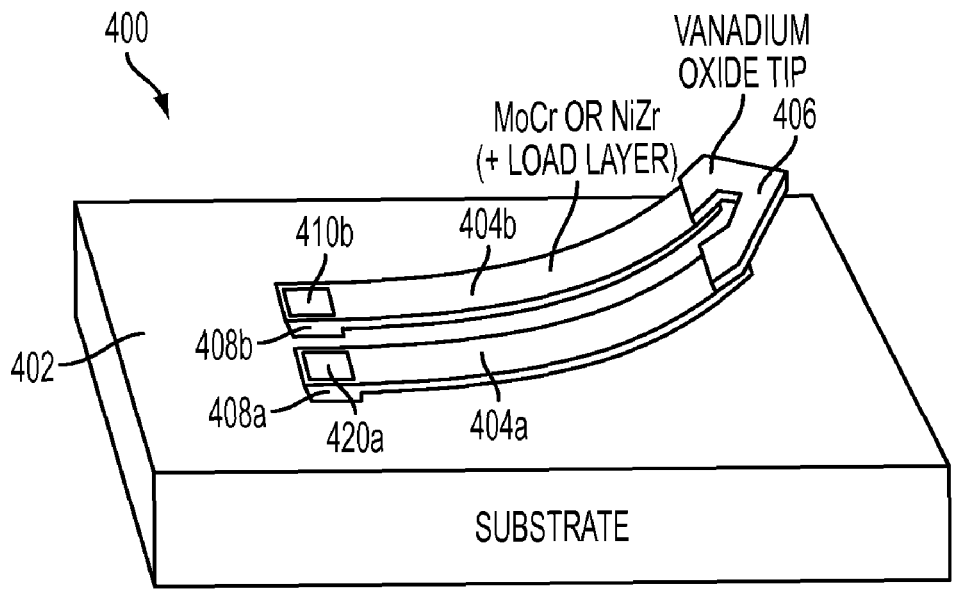
FIG. 4 illustrates a hybrid cantilever temperature probe, manufactured according to FIGS. 3A-3J.

FIGS. 3A-3J illustrate the process 300 used to form a hybrid temperature probe, such as probe 400 shown in FIG. 4, having a thermal sensor carried on a cantilever. Initially, a silicon or other appropriate substrate is provided (step 302), then a sacrificial layer of titanium, amorphous silicon or other appropriate sacrificial material is deposited onto the substrate (step 304). Next a dielectric layer is deposited and patterned, which will serve to electrically passivate the thermistor material (step 306). In this embodiment, a thermistor material (e.g., vanadium oxide (VOx) or p+ amorphous silicon (p+ a-Si)) is deposited (step 308). Following this step, a stressed metal (e.g., an alloy of molybdenum and chromium, denoted as MoCr, or an alloy of nickel and zirconium, denoted as NiZr) is deposited and patterned to form a two-leg component (step 310). The stressed metal contacts the vanadium oxide, which forms a bridge between the two legs. In step 312 a top passivation dielectric is deposited, and in step 314 a thin gold layer is deposited to provide a good electrical contact to the sensor. In steps 316, 318 and 320 the sacrificial layer is selectively etched away, resulting in the release of the cantilever structure, which in this case is a hybrid cantilever temperature (thermistor) probe, with one end attached to the substrate and a free end extending out of the substrate, and carrying the thermistor tip portion. The above process may optionally incorporate a load layer.

With attention to FIG. 4, probe 400 may be considered to have been manufactured by the process of FIG. 3A-3J, resulting is a hybrid vanadium oxide thermal temperature probe, carried on a substrate 402. Probe 400 includes two separate legs 404a, 404b, bridged by vanadium oxide tip portion 406, and anchor portions 408a, 408b. Electrical pad contacts 420a, 410b are located to allow electrical input to the probe 400. The probe consists of a tip of vanadium oxide and a different stressed material such as MoCr or NiZr. The optional load layer is used to control lift height and/or to provide strength and robustness to the probe structure.

The thermal sensor, in the form of the vanadium oxide thermistor tip 406 carried on a cantilever legs 404a, 404b formed by the process of FIGS. 3A-3J is essentially a resistor, where current flows in through one leg of the cantilever structure and flows out of the other leg. Since the current passes through the vanadium oxide tip 406, probe 400 it will be highly sensitive to temperature changes at the tip 406.

There is evidence the sensitivity of vanadium oxide thermistors increase when fabricated at higher temperatures. One such fabrication technique which can employ higher temperatures is when the thermistors are fabricated on thick glass substrates made out of p+ amorphous silicon. This fabrication process enables higher temperature fabrication for more sensitive thermal sensors, as well as enabling tighter tolerances that will result in better balanced resistivity, an additional avenue for sensitivity improvement.

In one embodiment cantilever fabrication according to processes 100 and 300, and variations thereof, are enabled by StressedMetal® technology invented and developed at Palo Alto Research Center (PARC) in Palo Alto, Calif. StressedMetal® is a registered trademark of PARC.

Figure 5:
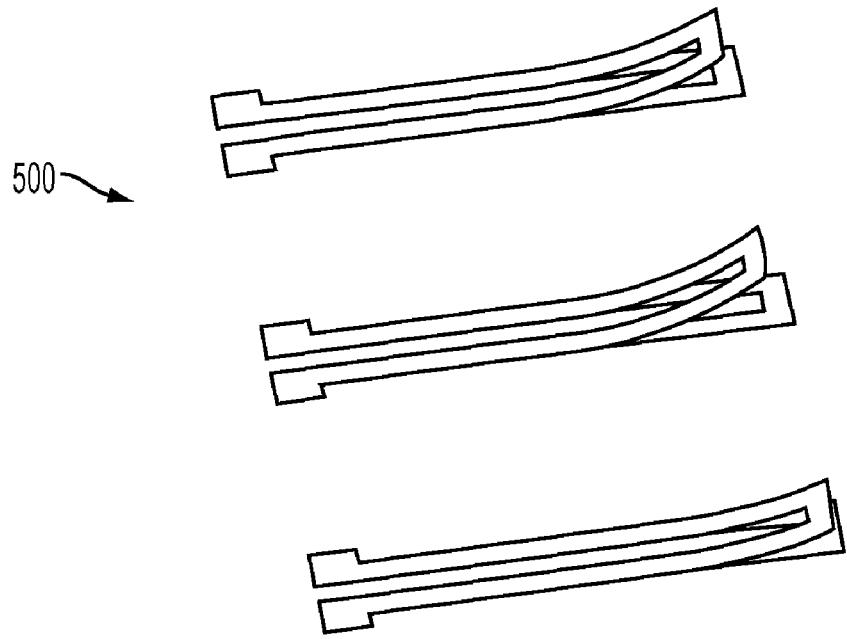
FIG. 5 is a view of one type of cantilever that could be used in a system of cantilever temperature (or thermistor) probes, manufactured according to FIGS. 1A-1E.
Figure 6:
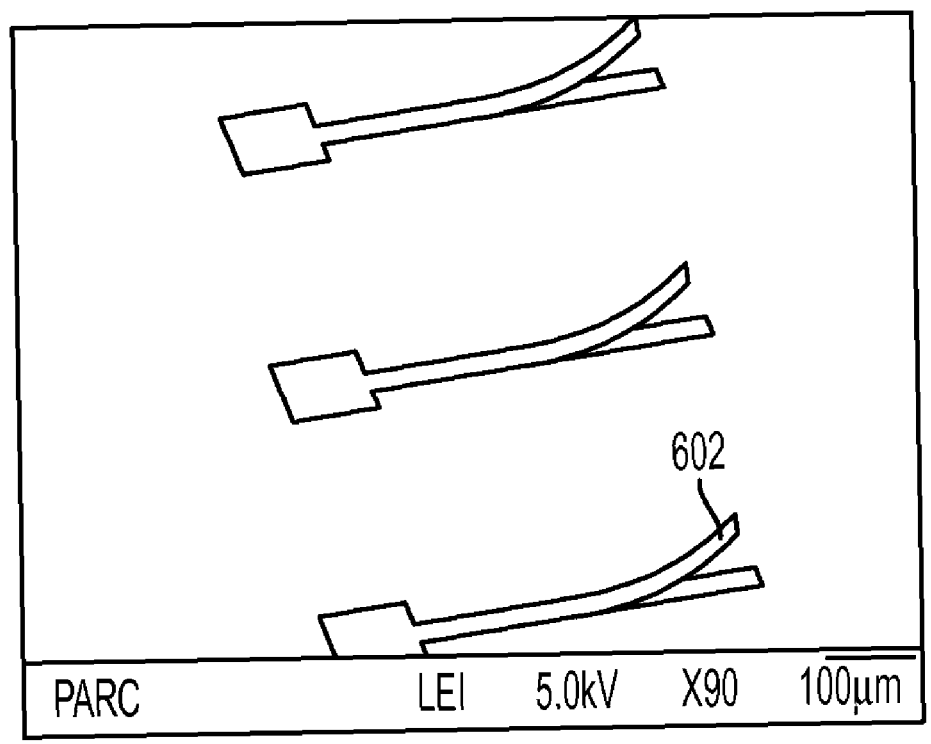
FIG. 6 is a view of an alternative type of cantilever that could be used in a system of cantilever temperature (or thermistor) probes manufactured according to FIGS. 1A-1E.

StressedMetal® technology is based on micro-fabrication techniques that take advantage of the stress that occurs in the thin film deposition process. In thin film deposition, extremely thin layers of metal film are deposited onto a substrate, such as silicon or glass. To create StressedMetal® micro-structures, films are sputter deposited with an engineered built-in stress gradient, on top of a sacrificial layer. After lithographic patterning, the sacrificial layer is etched away and the micro-structures are released. The metal's inherent stress causes it to lift or curl into a designed radius of curvature, creating 3D structures such as tiny coils, springs, or cantilevers. An example of a plurality or array of two-legged cantilever probes 500 formed by this process is shown in FIG. 5. The process of FIGS. 1A-1E, as understood by one of skill in the art, is adjustable to manufacture alternatively formed probes. For example FIG. 6 depicts probes 600 having a single leg 602.

As previously mentioned the cantilever probes (or sensors) depicted in FIGS. 2 and 4 are made using a fabrication process that combines these techniques with the high quality, low-noise vanadium oxide thermistor material. The process is also used to fabricate and test higher sensitivity p+ amorphous silicon thermistors, as well as higher temperature processes for vanadium oxide that have an improved sensitivity. Preliminary data on p+ amorphous silicon shows a temperature coefficient of resistance as high as 4%/K for this material, compared with 2.8%/K. Literature on vanadium oxide suggests values as high as 5.2%/K are feasible with modified deposition.

Figure 7:
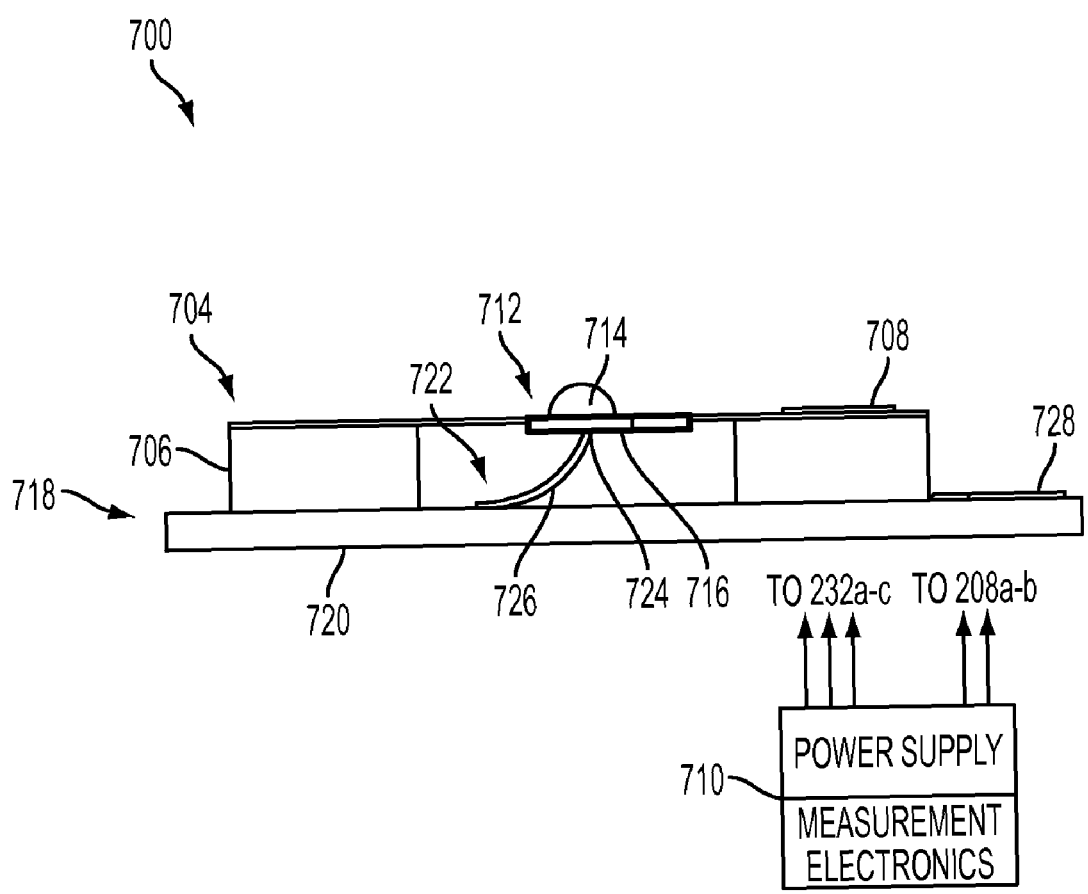
FIG. 7 is an illustration of an environment in which the probes of the present application are implemented

Temperature probes manufactured according to the described processes (e.g., 100, 300) and variations thereof, find use in a variety of applications. FIG. 7 illustrates one such use, where the probes are used in a non-integrated nanocalorimeter (e.g., a thermal sensing cell) device 700. As described in more detail by U.S. patent application Ser. No. 12/467,072, titled Nanocalorimeter Based On Thermal Probes, filed May 15, 2009. Device 700 includes a drop merging layer 702, having a thin thermally insulating substrate (e.g., plastic film, Kapton membrane, PEN membrane, or other appropriate thermally insulating material) 704 carried on a frame (or stiffener) 706. On the surface of thin substrate 704 are activation contact pads 708 arranged to receive energy (from a power source 710) to implement the merging operation. Conductive lines (not shown) are formed to carry the activation energy, to drop mergers (or drop merging areas) 712 which receive the energy from the conductive lines (not shown) to perform a merging operation to form drops 714. Drop merging layer 702 also includes thermal equilibration areas 716. The thermal equilibration areas are thermally conductive areas of the merging layer 702 that conduct heat well enough that lateral temperature non-uniformities are minimized across the drop merging areas.

A bottom (or measurement) layer 718 of device 700 includes a substrate 720 which carries cantilever temperature probes 722, constructed according to the concepts of the present application, which in one embodiment has a thermal sensor at a tip portion 724 and cantilever portion 726. Also carried on measurement layer 718 are temperature measurement contact pads 728 and conductive lines (not shown) which connect the cantilever thermistor probes 700 to the temperature measurement contact pads 728. As illustrated by FIG. 7 the independent construction of the drop merging layer 702 and layer 718 separates the surface of the thin substrate 704 (which carries the drop mergers 712 and cantilever temperature probes 726 from each other.

In this embodiment the thermal sensor is on the tip of a $\approx 3$ μm thin cantilever that is located in operative contact with the backplane island portion of thermal equilibration area 716. It is to be understood that operative contact includes having the thermal sensor tip 724 in actual physical contact with the thermal equilibration areas 716, as well as coming within sufficient proximity of the thermal equilibration areas 716 to allow for the transfer of heat but without actual physical contact with the thermal equilibration areas. This close proximity is achieved in some embodiments when the thermal sensor is less than 1 micron away (but still not in actual physical contact) and up to about 5 microns away from a thermal equilibration area. Heat is transferred to thermal equilibration areas 716 and is sensed by thermal sensor tip 724 carried on cantilever 726, and is then passed to measurement electronics 710.

Heat conduction along the cantilever is small compared with the heat conduction through the air because the cantilever is kept thin, so the thermal time constant of the detector is not reduced, as desired. COMSOL® calculations presented below provide more detail. COMSOL® is a registered trademark of COMSOL AB Corporation of Sweden, for a finite element analysis and solver software package for various physics and engineering applications.

The surface of the cantilevers of temperature probes can be coated (after release) with a thin layer of for instance parylene in order to chemically and electrically passivate the cantilevers. It is also noted, the cantilever temperature probes, are self-heated by the electrical current flowing through them. Also, by altering the patterning steps of the described processes, and as previously mentioned, devices with multiple legs, microbridges or doubly clamped cantilevers, membranes, etc. may be formed. Still further multi-layered composite beams can be realized by employing the present concepts; for instance, in one embodiment a dual beam device consisting of a stressed metal layer, an insulating dielectric layer, and a $VO_x$ layer on top may be built. Still further, a reference device (unreleased cantilever) can be used in conjunction in order to realize a half- or full Wheatstone bridge configuration for differential temperature measurements.

It is mentioned here that the probes (or microprobes) as described herein should be generally understood as temperature (thermometer, thermal, etc.) probes, as opposed to bimorph components where the cantilever deflection is used as a measure for temperature change.

It will be appreciated that various ones of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A temperature probe comprising:
   a substrate;
   a cantilever body portion formed on the substrate by sputter deposition, including an anchor portion held in contact to the substrate and a free end portion extending out of the surface of the substrate; and
   a thermistor sensor portion located at the free end portion of the cantilever body portion, wherein the thermistor sensor portion is comprised of a sputter-deposited semiconductor material.

2. The temperature probe according to claim 1, further including electrical contact pads positioned to receive an electrical input.

3. The temperature probe according to claim 1 wherein the temperature probe is a monolithic temperature probe, having the cantilever body portion and the sensor portion comprised of a sputter-deposited semiconductor material.

4. The temperature probe according to claim 1 wherein the sputter-deposited semiconductor material is stressed engineered in an atmosphere having an Argon (Ar):Oxygen (O.sub.2) mixture ratio in a range of 20:1 (Ar:O.sub.2) to 5:1 (Ar:O.sub.2).

5. The temperature probe according to claim 4 wherein the stressed engineered vanadium oxide is sputter-deposited vanadium oxide.

6. The temperature probe according to claim 1 wherein the cantilever is a two legged cantilever and the sensor portion is a bridge connecting the two legs.

7. The temperature probe according to claim 1 wherein the cantilever is a single legged cantilever and the sensor portion is a tip and an end of the single leg.

8. The temperature probe according to claim 1 wherein the temperature probe is a hybrid temperature probe, having the cantilever body portion comprised of a stressed metal.

9. The temperature probe according to claim 1 wherein the sputter-deposited semiconductor material of the sensor portion is sputter-deposited vanadium oxide.

10. A method for manufacturing a temperature probe comprising:
    depositing a thin film of a sacrificial material on a substrate;
    patterning the sacrificial material;
    depositing a first layer of vanadium oxide;
    depositing a second layer of vanadium oxide;
    patterning the deposited first and second layers of vanadium oxide; and
    etching the sacrificial layer to release the patterned first and second layers of vanadium oxide.

11. The method according to claim 10 wherein the steps of depositing the first and the second layers of vanadium oxide include using vanadium which is oxidized in situ.

12. The method according to claim 10 wherein a mixed atmosphere Argon and Oxygen is used in the depositing of the first and second layers of vanadium oxide.

13. The method according to claim 12 wherein the ratio of Argon to Oxygen is 10 to 1.

14. The method according to claim 12 wherein the ratio of Argon to Oxygen is in a range of approximately 20:1 (Ar:O.sub.2) to 5:1 (Ar:O.sub.2).

15. The method according to claim 10, wherein the patterning of the first and second layers of vanadium include patterning two leg portions and a tip portion extending between and interconnecting the two leg portions.

16. The method according to claim 15, wherein the tip portion is of a narrower width than the two leg portions.

17. The method according to claim 10, wherein the depositing of the first and second layers of vandium oxide include employing DC power in the range of approximately 100 W DC to approximately 800 W DC.

18. The method according to claim 10, wherein the atmospheric pressure used in the depositing of the first and second layers of vanadium oxide range between approximately 1 mTorr to approximately 10 mTorr.

19. A method for manufacturing a temperature probe comprising;
    depositing a thin film of a sacrificial material on a substrate;
    patterning the sacrificial layer;
    depositing a dielectric layer;
    patterning the dielectric layer;
    depositing a thermistor material;
    depositing a stressed metal layer;
    patterning the thermistor layer and the stressed metal layer, wherein the thermistor and stressed metal layer are in contact;
    depositing a second dielectric layer;
    depositing a thin gold layer;
    etching away a portion of the sacrificial layer, releasing a cantilever structure; and
    etching another portion of the sacrificial layer to release patterned first and second layers of vanadium oxide.

* * * * *